(12) United States Patent
Standke et al.

(10) Patent No.: US 6,528,585 B1
(45) Date of Patent: Mar. 4, 2003

(54) CROSS-LINKABLE POLYMERS, METHOD FOR THE PRODUCTION THEREOF, AND SHAPED BODIES MADE OF CROSS-LINKED POLYMERS

(75) Inventors: Burkhard Standke, Lörrach (DE); Jaroslaw Monkiewicz, Rheinfelden (DE); Albert-Johannes Frings, Rheinfelden (DE); Ralf Laven, Frankfurt (DE); Roland Edelmann, Wehr (DE); Peter Jenkner, Rheinfelden (DE); Helmut Mack, Rheinfelden (DE); Michael Horn, Rheinfelden (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 09/830,157

(22) PCT Filed: Oct. 14, 1999

(86) PCT No.: PCT/EP99/07729

§ 371 (c)(1),
(2), (4) Date: Jul. 19, 2001

(87) PCT Pub. No.: WO00/23486

PCT Pub. Date: Apr. 27, 2000

(30) Foreign Application Priority Data

Oct. 21, 1998 (DE) .......................... 198 48 351

(51) Int. Cl.$^7$ .......................... C08F 8/00; C08F 259/00; C08F 130/08
(52) U.S. Cl. .................. 525/102; 525/105; 525/106; 525/276; 526/279
(58) Field of Search ............... 525/102, 105, 525/106, 276; 526/279

(56) References Cited

U.S. PATENT DOCUMENTS

| | | |
|---|---|---|
| 5,282,998 A | 2/1994 | Horn et al. |
| 5,350,812 A | 9/1994 | Sultan et al. |
| 5,459,198 A * | 10/1995 | Sharp ........................ 525/102 |
| 5,808,125 A | 9/1998 | Standke et al. |
| 5,849,942 A | 12/1998 | Standke et al. |
| 5,859,076 A | 1/1999 | Kozma et al. |
| 5,863,509 A | 1/1999 | Standke et al. |
| 5,885,341 A | 3/1999 | Standke et al. |
| 5,932,757 A | 8/1999 | Standke et al. |
| 5,994,474 A | 11/1999 | Wey et al. |
| 6,054,601 A | 4/2000 | Standke et al. |
| 6,100,418 A | 8/2000 | Standke et al. |
| 6,133,466 A | 10/2000 | Edelmann et al. |
| 6,177,584 B1 | 1/2001 | Loewenberg et al. |
| 6,228,936 B1 | 5/2001 | Standke et al. |
| 6,239,194 B1 | 5/2001 | Standke et al. |
| 6,251,989 B1 | 6/2001 | Edelmann et al. |
| 6,255,513 B1 | 7/2001 | Standke et al. |
| 6,281,288 B1 | 8/2001 | Bickert et al. |
| 6,288,256 B1 | 9/2001 | Standke et al. |
| 6,361,871 B1 * | 3/2002 | Jenkner et al. |

FOREIGN PATENT DOCUMENTS

| | | |
|---|---|---|
| EP | 0 518 057 | 12/1992 |
| EP | 0 827 994 | 3/1998 |
| WO | WO 90/07542 | 7/1990 |
| WO | WO 98/21252 | 5/1998 |

* cited by examiner

*Primary Examiner*—James J. Seidleck
*Assistant Examiner*—Olga Asinovsky
(74) *Attorney, Agent, or Firm*—Oblon, Spivak, McClelland, Maier & Neustadt, P.C.

(57) ABSTRACT

The invention relates to a process for preparing crosslinkable polymers containing silane groups having at least one hydrolyzable radical by free-radical-initiated grafting of the base polymers with an olefinically unsaturated silane having at least one hydrolyzable radical, wherein the grafting is carried out in the presence of (a) an alkylsilane of the formula I,

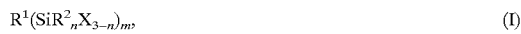

$$R^1(SiR^2_nX_{3-n})_m, \quad\quad (I)$$

where
$R^1$ is a monovalent hydrocarbon radical having from 1 to 33 carbon atoms or a divalent hydrocarbon radical having from 4 to 24 carbon atoms,
$R^2$ is a hydrocarbon radical having from 1 to 10 carbon atoms,
X are identical or different hydrolyzable radicals,
n is 0, 1 or 2 and
m is 1 or 2 and/or (b) a fluoroalkylsilane of the formula

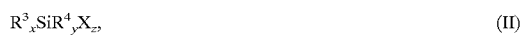

$$R^3_xSiR^4_yX_z, \quad\quad (II)$$

where
$R^3$ is a fluoroalkyl radical,
$R^4$ is an alkyl radical and
X is a hydrolyzable radical,
x is an integer from 1 to 3,
y is 0, 1 or 2 and
z is an integer from 1 to 3,
with the proviso that the sum x+y+z=4.

9 Claims, No Drawings

CROSS-LINKABLE POLYMERS, METHOD FOR THE PRODUCTION THEREOF, AND SHAPED BODIES MADE OF CROSS-LINKED POLYMERS

The invention relates to crosslinkable polymers which contain hydrolyzable silane groups and also a process for their preparation by means of a grafting reaction. The invention further relates to a process for producing moldings by shaping and crosslinking the crosslinkable polymers. The invention finally relates to the moldings produced in this way.

1. PRIOR ART

Moldings made of crosslinked polymers have, inter alia, good mechanical properties, high thermal stability and good resistance to chemical and physical influences. Such moldings are produced starting from a crosslinkable polymer which is brought to the desired shape and crosslinked. A known process uses standard polymers which are crosslinked by electron beams after shaping. This process is costly in terms of apparatus and requires comprehensive radiation protection measures. Standard polymers can also be crosslinked by heating with a free-radical initiator. This process is energy-intensive and allows only low output rates.

Another process which has become known under the name SIOPLAS is described in U.S. Pat. No. 3,646,155. In a first stage of this process, polyolefins are reacted with an unsaturated hydrolyzable silane (i.e. a silane containing at least two hydrolyzable substituents), advantageously in a screw extruder, at a temperature of >140° C. in the presence of a free-radical initiator. This forms a grafted polyolefin having hydrolyzable silane groups located on side chains. In a second stage, the hydrolyzable silane groups are hydrolyzed by means of water and the silanol groups formed are condensed in the presence of a catalyst. According to the patent, the condensation catalyst can be added, before, during or after the grafting reaction. The catalyst is preferably added to the crosslinkable polyolefin immediately before shaping, advantageously in the form of a masterbatch comprising the unmodified polyolefin and the catalyst which is homogenized with the crosslinkable polyolefins. This procedure enables the production of the crosslinkable polyolefin to be carried out by the raw materials manufacturer and the mixing with the catalyst to be carried out by the producer of the moldings.

The MONOSIL process which has become known from U.S. Pat. No. 4,117,195 corresponds to a large extent to the SIOPLAS process of U.S. Pat. No. 3,646,155, but the condensation catalyst is added during the grafting reaction and the crosslinkable polymer catalyzed in this way is then immediately shaped and crosslinked to produce a molding. This process is carried out completely by the producer of the moldings.

In the COPO process of Jap. Kokai Tokkyo Koho 80 155.040 (Mitsubishi Petrochemical), the crosslinkable silane groups are not introduced by grafting but instead an olefin and an olefinically unsaturated hydrolyzable silane are polymerized in the presence of a free-radical initiator and a silane condensation catalyst to form a crosslinkable copolymer. The crosslinkable silane groups are located on the main polymer chain. Crosslinking again occurs by hydrolysis and subsequent catalyzed silanol condensation.

According to EP-B1-0 351 241, EP-A2-0 245 938 and WO 90/07542, premature crosslinking can occur in all three processes during the preparation of the polymer containing silane groups and before the planned crosslinking reaction. This premature crosslinking leads, according to the first two of the abovementioned documents, to difficulties in the production of moldings or to moldings having unsatisfactory physical and mechanical properties. The premature crosslinking is said to be particularly disadvantageous in the production of wire and cable insulation. According to the first of the 3 publications mentioned, the premature crosslinking can be countered by adding an ester of dipentaerythritol with one or more $C_4$–$C_8$-carboxylic acids and an organometallic silanol condensation catalyst to the crosslinkable polymer. The second of the publications mentioned describes the addition of at least 2% by weight of a filler of one or more water-binding substances, namely an organic ortho ester, an organic ketal or acetal or a siloxane (inappropriately referred to as "silane") of the formula $$R_9R_{10}R_{11}\text{—Si—}[OSiR_{12}R_{13}]R_{14},$$

where $R_9$, $R_{10}$, $R_{11}$, $R_{12}$, $R_{13}$ and $R_{14}$ are identical or different and are each hydrogen, a hydrocarbon radical or an oxyhydrocarbon radical.

According to the abovementioned publication WO 90/07542, premature crosslinking leads to gelling and adhesion of the gel to the surfaces of the apparatus. Sticky deposits are formed, with the risk of a blockage so that mechanical and therefore time-consuming cleaning of the extruder becomes necessary after a relatively short time. If the crosslinkable polymer is used for producing cables by sheathing wires, the crosslinked polymer adheres relatively strongly to the metal so that the sheathing cannot be stripped off easily, which is a disadvantage, for example, when making connections. A further disadvantage caused by premature crosslinking is that gel particles form lumps in the molding, which in the case of thin layers, e.g. films, results in the product being unusable in most cases. WO 90/07542 proposes that premature crosslinking be countered by additionally using a silane of the formula $$R^1(SiR^2{}_nX_{3-n})_m.$$

In the formula, $R^1$ is a monovalent hydrocarbon radical having from 13 to 30 carbon atoms or a divalent hydrocarbon radical having from 4 to 24 carbon atoms, $R^2$ are identical or different hydrocarbon radicals having from 1 to 10 carbon atoms, X are identical or different hydrolyzable radicals, n is 0, 1 or 2 and m is 1 or 2.

The crosslinkable polymer can be a copolymer or graft polymer containing hydrolyzable silane groups. The silane of the formula I can be solid or liquid and is in each case mixed into the finished crosslinkable polymer. In the case of a solid, this can be achieved by dispersing it homogeneously, e.g. in an extruder. In the case of liquids, incorporation by impregnation is a further possibility.

2. SUMMARY OF THE INVENTION

The invention provides a process for preparing crosslinkable polymers containing silane groups having at least one hydrolyzable radical by free-radical-initiated grafting of the base polymers with an olefinically unsaturated silane having at least one hydrolyzable radical, wherein the grafting is carried out in the presence of (a) an alkylsilane of the formula I, $$R^1(SiR^2{}_nX_{3-n})_m, \qquad (I)$$

where $R^1$ is a monovalent hydrocarbon radical having from 1 to 33 carbon atoms or a divalent hydrocarbon radical having from 4 to 24 carbon atoms, $R^2$ is a hydrocarbon radical having from 1 to 10 carbon atoms, X are identical or different hydrolyzable radicals, n is 0, 1 or 2 and m is 1 or 2 and/or (b) a fluoroalkylsilane of the formula $$R^3_x SiR^4_y X_z, \qquad (II)$$

where $R^3$ is a fluoroalkyl radical, $R^4$ is an alkyl radical and

X is a hydrolyzable radical, x is an integer from 1 to 3, y is 0, 1 or 2 and z is an integer from 1 to 3, with the proviso that the sum x+y+z=4.

The invention also provides the crosslinkable polymers which contain silane groups having at least one hydrolyzable radical and also an alkylsilane (a) and/or a fluoroalkylsilane (b) and are obtainable by the process of the invention.

The invention further provides a process for producing moldings based on polymers crosslinked via siloxane bridges (—Si—O—Si—), in which process the crosslinkable polymers containing silane groups having at least one hydrolyzable radical of the invention which have been brought to the desired shape are treated with water.

The invention finally provides the moldings obtainable in this way.

3. ADVANTAGES OF THE INVENTION

In contrast to the teachings of WO 90/07542, the alkylsilane I and/or the fluoroalkylsilane II are not mixed afterwards into the preformed crosslinkable polymer containing silane groups having at least one hydrolyzable radical, but instead are added during the preparation of the latter. This saves a process step and significantly suppresses the above-mentioned formation of sticky deposits on the surfaces of the equipment during the grafting reaction. Accordingly, the operating periods are lengthened and the apparatus does not have to be cleaned mechanically, and thus labor-intensively, as often. In the further use of the crosslinkable polymers, too, a lower level of sticky deposits is obtained than in the case of polymers without the additives (a) and/or (b). This is an advantage, for example, in the production of cables by sheathing copper or aluminum conductors. Here, adhesion of the crosslinked polymeric insulation material to the conductor is undesirable because it hinders future processing (insulation removal).

4. DESCRIPTION OF THE INVENTION

Suitable thermoplastic base polymers are, in particular, polyolefins such as polyethylene in its different variants (HDPE, MDPE, LDPE, LLDPE, VLDPE and metallocene-PE) or copolymers of ethylene with one or more comonomers such as alpha-olefins, e.g. propylene, 1-butene, 1-hexene, 1-octene and 4-methyl-1-pentene; vinyl esters, e.g. vinyl acetate and vinyl propionate; esters of acrylic or methacrylic acid, e.g. methyl (meth)acrylate, ethyl (meth) acrylate, butyl (meth)acrylate and 2-ethylhexyl (meth) acrylate; olefinically unsaturated carboxylic acids or carboxylic anhydrides, e.g. (meth)acrylic acid, maleic acid, fumaric acid and maleic anhydride; derivatives of olefinically unsaturated carboxylic acids, e.g. (meth)acrylonitrile or (meth)acrylamide; vinyl ethers, e.g. vinyl methyl ether, vinyl butyl ether and vinyl phenyl ether; and also vinylaromatic compounds such as styrene and alpha-methylstyrene. The comonomers of ethylene are advantageously present in an amount of up to 40% by weight, in particular from 1 to 25% by weight, of the copolymer. The base polymers advantageously have melting or softening points of from 90 to 120° C., so that they are in the form of more or less high-viscosity melts under the conditions of grafting which is generally carried out at from 120 to 220° C.

The silane used for grafting contains an olefinically unsaturated radical and at least one hydrolyzable radical, advantageously 3 hydrolyzable radicals. It corresponds to the formula $$R^5 SiR^6_{3-z} X_z, \qquad (III)$$

where $R^5$ is an olefinically unsaturated radical, $R^6$ is an alkyl radical and X is a hydrolyzable radical and z is an integer from 1 to 3.

The olefinically unsaturated radical $R^5$ can be, for example, an alkenyl radical having from 2 to 6 carbon atoms, e.g. allyl, methyl allyl or 2-butenyl, and is advantageously a vinyl radical. Other suitable olefinically unsaturated radicals $R^5$ are (meth)acryloxyalkyl radicals having from 5 to 10 carbon atoms. $R^6$ is preferably an alkyl radical having from 1 to 8 carbon atoms, in particular from 1 to 4 carbon atoms. Preferred hydrolyzable radicals X are alkoxy radicals having from 1 to 5 carbon atoms, in particular ethoxy or methoxy radicals. Other suitable hydrolyzable radicals are, for example, acyloxy radicals of aliphatic carboxylic acids, in particular fatty acids, having from 2 to 6 carbon atoms and also chlorine or bromine atoms. Suitable silanes containing olefinically unsaturated and hydrolyzable radicals are vinyltrimethoxysilane, vinyltriethoxysilane, vinylbismethoxyethoxysilane, vinyltriacetoxysilane, gamma-acryloxypropyltrimethoxysilane, gamma-methacryloxypropyltrimethoxysilane and gamma-methacryloxypropyltriethoxysilane.

The silane III used for grafting is employed in only small amounts. Advantageously, 1 equivalent of silane is used per 100–10,000, in particular 500–2,000, equivalents of repeating units of the polymer.

An essential feature of the invention is that the grafting reaction is carried out in the presence of (a) an alkylsilane of the formula I and/or (b) a fluoroalkylsilane of the formula II.

In the alkylsilane of the formula I $$R^1(SiR^2_n X_{3-n})_m \qquad (I),$$

$R^1$ is a monovalent hydrocarbon radical having from 1 to 33, preferably from 3 to 18 and in particular from 6 to 12, carbon atoms or a divalent hydrocarbon radical having from 4 to 24, advantageously from 8 to 16 and in particular from 6 to 12, carbon atoms, $R^2$ are identical or different hydrocarbon radicals, in particular alkyl radicals, having from 1 to 20, advantageously from 1 to 10 and in particular from 1 to 7, carbon atoms, or phenyl radicals, X are identical or different hydrolyzable radicals, advantageously alkoxy radicals having from 1 to 5 carbon atoms, in particular ethoxy or methoxy radicals, or acyloxy radicals of carboxylic acids, in particular fatty acids, having from 2 to 6 carbon atoms, or chlorine or bromine atoms, n is 0, 1 or 2 and m is 1 or 2 and preferably 1.

The alkylsilanes I are generally liquid at room temperature and boil at above 200° C., so that they have a relatively low vapor pressure at the temperatures at which the grafting of the base polymers and the shaping of the crosslinkable polymers take place and in any case do not boil.

Suitable alkylsilanes I are, for example, n-octyltriethoxysilane, tetradecyltrimethoxysilane, hexadecyltriethoxysilane, hexadecyltrimethoxysilane, hexadecyltriacetoxysilane, methylhexadecyldiacetoxysilane, methylhexadecyldimethoxysilane, octadecyltrimethoxysilane, octadecyltrichlorosilane, octadecyltriethoxysilane and 1,12-bis(trimethoxysilyl)dodecane.

In the fluoroalkylsilane of the formula II

$$R^3_x SiR^4_y X_z \qquad (II),$$

$R^3$ are identical or different monofluorinated, oligofluorinated or perfluorinated alkyl radicals, advantageously having from 1 to 12, in particular from 1 to 9, carbon atoms, with or without an oxygen or sulfur atom in the carbon chain, $R^4$ are identical or different alkyl radicals having from 1 to 20 carbon atoms, advantageously from 1 to 10, in particular from 1 to 7, carbon atoms, or identical or different aryl radicals, in particular phenyl radicals, X are identical or different hydrolyzable radicals, advantageously alkoxy radicals having from 1 to 5 carbon atoms, in particular ethoxy or methoxy radicals, or acyloxy radicals of carboxylic acids, in particular fatty acids, having from 2 to 6 carbon atoms, or chlorine or bromine atoms, x is an integer from 1 to 3, y is 0, 1 or 2 and z is an integer from 1 to 3, with the proviso that the sum x+y+z=4.

Suitable fluoroalkylsilanes are, for example, 2-fluoroethyltrimethoxysilane, 2-fluoroethyltrichlorosilane, perfluoropropyltrimethoxysilane, perfluoropropyltriacetoxysilane, bisperfluoropropyldimethoxysilane, perfluoropropylmethyldiacetoxysilane, perfluoropropylmethyldimethoxysilane and 3,3,4,4,5,5,6,6,7,7,8,8,8-tridecafluorotrimethoxysilane.

The additives I and/or II are advantageously employed in amounts of from 0.001 to 15% by weight, preferably from 0.1 to 5% by weight and in particular from 0.1 to 3% by weight, based on the base polymer. The optimum amount depends, inter alia, on the respective base polymer and on the additive selected and can be readily determined by simple tests.

The grafting reaction is initiated by free radicals which are supplied by free-radical initiators whose decomposition temperature determines the temperature of the grafting reaction. Suitable free-radical initiators are peroxides such as dibenzoyl peroxide, dicumyl peroxide, di-tert-butyl peroxide, tert-butyl cumyl peroxide, bis-tert-butylperoxyisopropylbenzene, bis(tert-butylperoxy) dimethylhexane or -hexyne; and also azo compounds such as azobisisobutyronitrile. The free-radical initiator is generally used in an amount of from 0.01 to 0.2% by weight, based on the base polymer.

The crosslinking of the silylated polymer occurs by hydrolysis of the silane groups and silanol condensation. It is accelerated by catalysts which promote these reactions. Known catalysts are carboxylic acid salts of various metals such as tin, zinc, iron, lead and cobalt, and organic bases. Specific mention may be made of salts such as dibutyltin dilaurate, dibutyltin diacetate, dioctyltin dilaurate, tin(II) acetate, lead naphthenate, zinc caprylate and cobalt naphthenate; amines such as ethylamines, dibutylamine, hexylamines and pyridines; inorganic acids such as sulfuric acid and hydrogen chloride; and organic acids such as para-toluenesulfonic acid, acetic acid and maleic acid. Preference is given to tin salts of carboxylic acids. The catalysts are advantageously introduced into the mixture for the grafting reaction and are advantageously used in amounts of from 0.01 to 0.1% by weight, preferably from 0.02 to 0.05% by weight, based on the base polymer.

Any further known auxiliaries or additives such as fillers (e.g. hydroxides, silicates, silicon dioxide), pigments or dyes (color masterbatches, carbon black), heat or UV stabilizers, oxidation inhibitors, processing aids (silicones, fluoropolymers) are likewise advantageously added to the mixture for the grafting reaction. For these purposes, known materials are used in the customary amounts appropriate to the purpose.

The crosslinkable polymers of the invention can be prepared batchwise or particularly advantageously continuously in heatable apparatuses which effect intimate mixing of the components. Suitable apparatuses are, for example, kneaders, roll mills, injection molding machines and preferably heatable single- or twin-screw extruders. In one embodiment of the process, a free-radical initiator, the olefinically unsaturated silane, the catalyst and the alkylsilane (a) and/or the fluoroalkylsilane (b) are allowed to act together on the base polymer, in the presence or absence of a solvent, prior to grafting. The components mentioned can be allowed to act on the base polymer in, for example, a tumble mixer at a temperature below the melting or softening point of the base polymer until they are absorbed by the latter. Alternatively, a free-radical initiator and/or the olefinically unsaturated silane and/or the catalyst and/or the alkylsilane (a) and/or the fluoroalkylsilane (b) can be used in the form of a masterbatch in the base polymer. Finally, the abovementioned additives can also be introduced into the mixing apparatus separately from the base polymer. The thermoplastic base polymer is, after being provided with the additives in one way or another, metered into the mixing apparatus, advantageously a heatable extruder, and melted. Depending on the melting or softening point of the base polymer, the viscosity of the melt and the decomposition temperature of the free-radical initiator selected, grafting takes place at a temperature which is generally from 120 to 250° C. The residence time of the reaction mixture is generally from 30 seconds to 15 minutes.

Owing to the hydrolyzability of the silane groups, it is advantageous to use starting materials which are as water-free as possible and to work with careful exclusion of water.

The homogeneous, grafted, crosslinkable polymer can be cooled after leaving the reaction zone and, after solidification, can be broken up in a customary manner, advantageously to form granules which can be shaped in the desired manner in a subsequent step, e.g. by injection molding or pressing. Alternatively, the melt can be brought directly to the shape desired for the future molding. In both cases, the crosslinkable polymer is crosslinked with formation of —Si—O—Si— bridges. This occurs in principle even on exposure to atmospheric moisture at room temperature or moderately elevated temperature. However, in the interests of acceptable crosslinking times, it is advantageous to select more energetic conditions, for example from 2 to 24 hours in a waterbath at from 60 to 100° C. As an alternative, use can be made of "saunas" in which the water acts in vapor form on the molding to be crosslinked. The products obtained in this way have a high heat distortion resistance, environmental stress cracking resistance and abrasion resistance. For example, the crosslinkable polymers can be processed to produce wire sheathing for electric cables, or to produce pipes, foams, injection-molded articles and blow-molded products.

The invention is illustrated by the following examples which do not, however, limit its scope as set forth in the claims.

EXAMPLE 1

Grafting in a Laboratory Extruder 5 kg of linear low density polyethylene (LLDPE; Escorene LLN 1004 YB from EXXON Chemical Europe Inc. (Belgium) (melt flow index=2.8 g/10 min; density= 0.918 g/cm$^3$) in granule form were heated to 50° C. in a tumble mixer and mixed with 1 g of vinyltrimethoxysilane (DYNASYLAN® VTMO from SIVENTO Chemie Rheinfelden GmbH, D-79618 Rheinfelden), 0.1 g of dicumyl peroxide (Interox® DCUP from Peroxid-Chemie GmbH, Pullach, Germany), 0.05 g of dibutyltin dilaurate (Tinnstab® BL 277 from Arcos Chemicals, Düren, Germany) and 0.1 g of octyltriethoxysilane (DYNASYLAN® OCTEO from SIVENTO) for 60 minutes. After this time, the liquid constituents of the mixture had been absorbed by the polyethylene and free-flowing granules were obtained. The grafting reaction was carried out in a corotating twin-screw extruder (ZE 25 from Hermann Berstorff Machinenbau GmbH, D-30627 Hannover; diameter=2.5 cm; length=82.5 cm). Operating parameters for the extruder were:

temperature profile (in ° C.):
140/150/170/195/200/200/200 (die head temperature)
output: about 4 kg/h.

The grafted, crosslinkable polymer was obtained in the form of a strip having a width of 20 mm and a thickness of 2 mm.

For crosslinking, the strips were stored for 8 hours in water at 80° C. and standard test specimens as specified in VDE 207/IEC 502/540 were stamped out for test purposes. Tests were carried out in accordance with VDE 207 and gave the following results:

| | |
|---|---|
| thermal expansion | 40–50% |
| gel content | 67% |
| tensile strength | 23.7 N/mm$^2$ |
| elongation at break | 1070% |

An amount of grafted, still uncrosslinked material was in each case placed on a copper plate and on an aluminum foil of 400 cm$^2$ each and pressed. The pressing conditions were:

| | |
|---|---|
| temperature | 200° C. |
| pressure | 750 kg/cm$^2$ |
| pressing time | 5 min |

The effect of the octyltriethoxysilane was tested by means of a comparative experiment without octyltrimeth-oxysilane under otherwise identical conditions. The following differences were found:

When octyltriethoxysilane was used, the tendency of the polymer to form sticky deposits in the extruder during grafting was significantly reduced. Accordingly, considerably less mechanical cleaning of the extruder was required.

Without octyltriethoxysilane, the crosslinked polymer could not be detached from the substrate without leaving sticky residues on the metal surface. When octyltrimethoxysilane was used, the polymer could be detached smoothly with significantly less force and without leaving sticky residues, even though alkylsilanes are known as coupling agents between polar and nonpolar materials.

EXAMPLE 2

Grafting and Sheathing of Copper Wire in a Production Extruder

A model 120 single-screw extruder (Nokia Maillefer S. A., Lausanne, Switzerland) having a grafting and sheathing tool, barrier screw and a length:diameter ratio of 30 was used. Operating parameters for the extruder were:

LLDPE granules with addition of silane, prepared as in Example 1 temperature profile in ° C. in the grafting tool:
cooling in feed section/120/150/170/220/220 temperature profile in ° C. in the sheathing tool:
uniform to the exit orifice 230 the rotational speed was varied in the range from 0 to 80 rpm, the output was accordingly varied from 0 to 400 m of cable/min. This variation was intended to simulate conditions close to production conditions with varying output including stoppage when changing material; it is known from experience that under these conditions there is a particular tendency to formation of sticky deposits on the screw and barrel wall.

cable diameter: 3 mm conductor diameter: 1.38 mm (=1.5 mm$^2$ cross-sectional area)

The effect of the octyltriethoxysilane was tested by means of a comparative experiment without octyltrimethoxysilane under otherwise identical conditions. After one week of operation, the extruder screw was withdrawn. It was found that the deposits on the metal surfaces were considerably less when octyltrimethoxysilane was used. There was correspondingly less need for mechanical cleaning.

EXAMPLE 3

Grafting in a Laboratory Extruder 5 kg of linear polyethylene (as in Example 1) were heated to 50° C. in a tumble mixer and mixed with 1 g of vinyltrimethoxysilane (as in Example 1), 0.1 g of dicumyl peroxide (as in Example 1), 0.05 g of dibutyltin dilaurate (as in Example 1) and 0.1 g of tridecafluorooctyltrimethoxy-silane (DYNASYLAN® F 8261 from SIVENTO) for 60 minutes. After this time, the liquid constituents of the mixture had been absorbed by the polyethylene and free-flowing granules had been formed. The grafting reaction was carried out in the twin-screw extruder used in Example 1. The extruded strip of crosslinkable polymer was crosslinked as in Example 1. Testing of the crosslinked polymer as in Example 1 gave the following values:

| Thermal expansion | 40–50% |
| --- | --- |
| Gel content | 74% |
| Tensile strength | 23.2 N/mm$^2$ |
| Elongation at break | 1095% |

Uncrosslinked polymer was, as in Example 1, pressed onto a copper plate and onto an aluminum foil.

The effect of the tridecafluorooctyltrimethoxysilane could be seen by comparison with the comparative experiment of Example 1. With regard to the sticky deposits on the metal surfaces of the extruder and the detachability of the crosslinked polymer from copper and aluminum, tridecafluorooctyltrimethoxysilane had a similar effect to the octyltrimethoxysilane in Example 1.

What is claimed is:

1. A process for preparing crosslinkable polymers containing silane groups having at least one hydrolyzable radical by free-radical-initiated grafting of the base polymers with an olefinically unsaturated silane having at least one hydrolyzable radical, wherein the grafting is carried out in the presence of
   (a) an alkylsilane of the formula I, $$R^1(SiR^2{}_n X_{3-n})_m \qquad (I)$$

where
   $R^1$ is a monovalent hydrocarbon radical having from 1 to 33 carbon atoms or a divalent hydrocarbon radical having from 4 to 24 carbon atoms,
   $R^2$ is a hydrocarbon radical having from 1 to 10 carbon atoms,
   X are identical or different hydrolyzable radicals,
   n is 0, 1 or 2 and
   m is 1 or 2 and
   (b) a fluoroalkylsilane of the formula $$R^3{}_x SiR^4{}_y X_z \qquad (II)$$

where
   $R^3$ is a fluoroalkyl radical,
   $R^4$ is an alkyl radical and
   X is a hydrolyzable radical,
   x is an integer from 1 to 3,
   y is 0, 1, or 2 and
   z is an integer from 1 to 3,
      with the proviso that the sum x+y+z=4.

2. The process as claimed in claim 1, wherein grafting is carried out in the presence of a catalyst for silanol linkage.

3. The process as claimed in claim 1, wherein a free-radical initiator, the olefinically unsaturated silane, the catalyst and the alkylsilane (a) and/or the fluoroalkylsilane (b) are allowed to act together on the base polymer prior to grafting.

4. The process as claimed in claim 1, wherein a free-radical initiator and/or the olefinically unsaturated silane and/or the catalyst and/or the alkylsilane (a) and/or the fluoroalkylsilane (b) are used in the form of a masterbatch in the base polymer.

5. The process as claimed in claim 1, wherein the grafting reaction is carried out in a heatable single- or twin-screw extruder.

6. A crosslinkable polymer containing silane groups having at least one hydrolyzable radical and also an (a) alkylsilane and a fluoroalkylsilane or (b) a fluoroalkylsilane as claimed in claim 1.

7. A crosslinkable polymer as claimed in claim 6 which contains a catalyst for silanol condensation.

8. A process for producing moldings based on polymers crosslinked via siloxane bridges (—Si—O—Si—), which comprises treating the crosslinkable polymers containing silane groups having at least one hydrolyzable radical as claimed in claim 1 which have been brought to the desired shape with water.

9. A molding obtainable by the process as claimed in claim 8.

\* \* \* \* \*